No. 897,029. PATENTED AUG. 25, 1908.
H. F. B. SNYDER.
SPRAYING APPARATUS.
APPLICATION FILED FEB. 21, 1907.
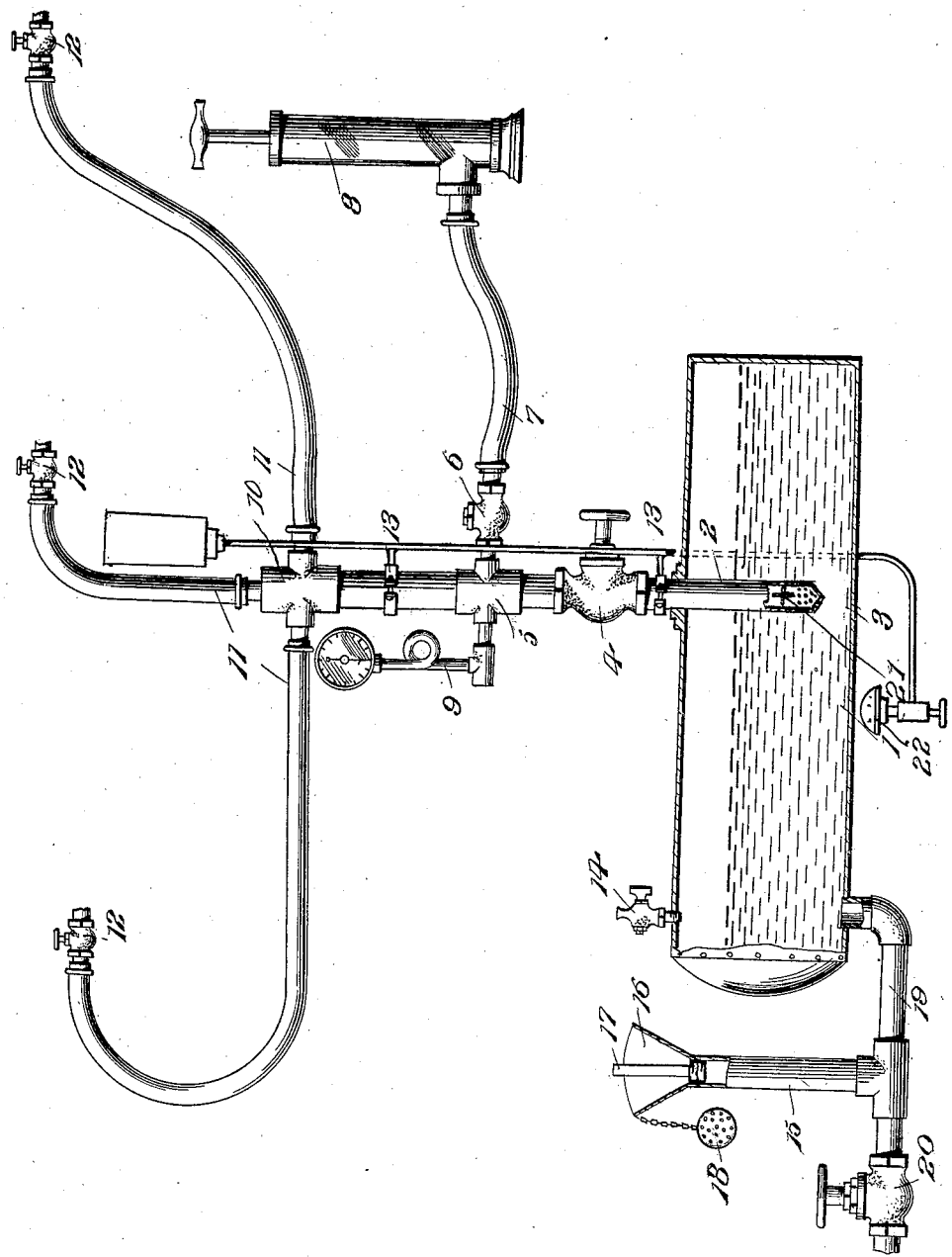
Witnesses
Inventor
H. F. B. Snyder
By
Attorneys

UNITED STATES PATENT OFFICE.

HILLDRETH F. B. SNYDER, OF MOSIER, OREGON, ASSIGNOR OF ONE-HALF TO ROLAND D. GOULD, OF HOOD RIVER, OREGON.

SPRAYING APPARATUS.

No. 897,029.   Specification of Letters Patent.   Patented Aug. 25, 1908.

Application filed February 21, 1907. Serial No. 358,689.

*To all whom it may concern:*

Be it known that I, HILLDRETH F. B. SNYDER, citizen of the United States, residing at Mosier, in the county of Wasco and State of Oregon, have invented certain new and useful Improvements in Spraying Apparatus, of which the following is a specification.

This invention relates to spraying apparatus, designed to contain insecticide or germicide or other liquid, for the purpose of spraying plants or trees, or for any other purpose and designed to have air compressed therein, so that it may be used to give off the fluid through suitable nozzles in the form of spray.

The invention has for its object a simple, durable and efficient construction of apparatus of this character having a filling tube and a drain pipe provided with a valve, the filling tube being connected with the drain pipe between the valve and the tank of the spraying apparatus so that the contents of the tank may be drained off readily, either passively, or, if desired, by air pressure applied by a pump, so as to effectively clear the tank from sediment, the said pump being primarily intended to store the tank with compressed air.

With this and other objects in view as will more fully appear as the description proceeds, the invention consists in certain constructions and arrangements of parts hereinafter described and claimed.

For a full description of the invention and the merits thereof and also to acquire a knowledge of the details of construction and the means for effecting the result, reference is to be had to the following description and accompanying drawings, in which: the figure is a side elevation of my improved spraying apparatus, the tank being shown in section.

My improved spraying apparatus embodies a tank 1, which may be formed of galvanized iron or other cheap metal sufficiently light and yet strong enough to resist the air pressure, and 2 designates the delivery pipe which is let into the tank 1 and which extends down into the tank close to the bottom thereof and is provided at its receiving end with a strainer 3.

Within the length of the delivery pipe 2 and just above the tank 1, I provide a globe valve 4 and beyond said globe valve a cruciform coupling 5, to one side arm of which is connected the casing of a check valve 6, which in turn is connected by flexible tubing 7 or the like, to the air pump 8, which may be of any desired construction and operated by any desired power. To the opposite side arm of the cruciform coupling 5, a gage 9 is attached, so as to indicate the air pressure. Manifestly, the valve in the casing 6 opens out from the pump. Beyond the coupling 5 and to the outer end of the delivery pipe 2, a second cruciform coupling 10 is attached, and to the diverging arms of this coupling, I attach the spray pipes 11, which are provided at their outer ends with globe valves or other similar controlling means 12 and with any desired form of spraying nozzle, (not shown).

13 designates upper and lower bands or clamps that are secured to the delivery pipe 2 above the tank and to which a gasolene or other heating device 22 is secured, so as to heat the contents of the tank 1, while they are within the tank and without the necessity of heating them before they are poured into the tank.

The tank 1 is provided with a vent cock 14 and it is also provided with a filling tube 15, formed with the funnel end 16 and designed to be closed by a screw plug or similar closure 17.

18 designates a straining disk, intended to be placed within the funnel 16, so as to strain the liquid as it is poured into the tube 15. The tube 15 is coupled to a pipe 19, which in turn is connected at one end to the tank 1, at the bottom thereof, and is provided at the opposite end with a globe valve 20. This pipe 19 serves as a portion of the filling pipe, and also as a drain pipe, it being only necessary to open the globe valve 20 to allow the contents of the tank 1 to flow off. It is obvious that the contents may be blown by the air pressure through the pipe 19, so as to effectively clean the interior of the tank.

From the foregoing description in connection with the accompanying drawing, it is evident that when the globe valve 20 is closed, the plug 17 may be removed and the tank filled to the proper level, such as that indicated by the dotted lines. The plug 17 is then replaced and the valves 12 closed, while the globe valve 4 is opened and the pump is operated so as to compress the air within the tank to the proper degree. Then it is evident that the liquid within the tank may be delivered therefrom in the form of spray through any one or more of the spray pipes 11. After the tank 1 has been charged with compressed air, the globe valve 4 may be closed whenever it is not desired to use the device, so as to relieve the pressure from the check valve 6 and the globe valves 12 and the individual spray pipes 11.

As illustrated in the drawing, the delivery pipe 2 is provided at its lower end with an agitating device 21 in the form of a paddle wheel, which is operated by the passage of the liquid through the pipe and acts as a mixer.

Having thus described the invention, what I claim as new is:—

A spraying apparatus comprising a tank, a drain pipe connected to said tank and provided with a drain valve, a filling tube connected to said drain pipe between the tank and the drain valve, a closure for the filling tube, a delivery pipe extending into the tank, a spray pipe connected to the delivery pipe, and an air pump having a connection with the delivery pipe between the spray pipe and the tank and provided with a check valve in said connection.

In testimony whereof I affix my signature in presence of two witnesses.

HILLDRETH F. B. SNYDER. [L. S.]

Witnesses:
ROLAND D. GOULD,
ALBERT NORDER.